United States Patent
Nguyen

(10) Patent No.: US 11,770,030 B2
(45) Date of Patent: Sep. 26, 2023

(54) ELECTRONIC DEVICE TRANSMITTING DATA IN RESPONSE TO RECEIVING POWER WIRELESSLY AND METHOD THEREOF

(71) Applicant: Samsung Electronics Co., Ltd., Suwon-si (KR)

(72) Inventor: Van Canh Nguyen, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 501 days.

(21) Appl. No.: 15/754,471

(22) PCT Filed: Sep. 13, 2016

(86) PCT No.: PCT/KR2016/010383
§ 371 (c)(1),
(2) Date: Feb. 22, 2018

(87) PCT Pub. No.: WO2017/048078
PCT Pub. Date: Mar. 23, 2017

(65) Prior Publication Data
US 2018/0248412 A1    Aug. 30, 2018

(30) Foreign Application Priority Data
Sep. 18, 2015 (KR) .................. 10-2015-0132493

(51) Int. Cl.
*H02J 50/80* (2016.01)
*H04L 67/06* (2022.01)
(Continued)

(52) U.S. Cl.
CPC ............. *H02J 50/80* (2016.02); *H02J 50/10* (2016.02); *H04B 5/0037* (2013.01); *H04L 67/06* (2013.01);
(Continued)

(58) Field of Classification Search
CPC .. H02J 50/80; H02J 50/10; H02J 7/025; H02J 2007/0096; H02J 7/00034; H04L 67/06;
(Continued)

(56) References Cited

U.S. PATENT DOCUMENTS 8,126,433 B2   2/2012  Haartsen
8,320,885 B2  11/2012  Haartsen
(Continued)

FOREIGN PATENT DOCUMENTS

JP      2010-041181 A    2/2010
KR  10-2011-0037245 A    4/2011
(Continued)

OTHER PUBLICATIONS

Korean Office Action with English translation dated Jul. 8, 2021; Korean Appln. No. 10-2015-0132493.

*Primary Examiner* — Drew A Dunn
*Assistant Examiner* — Manuel Hernandez
(74) *Attorney, Agent, or Firm* — Jefferson IP Law, LLP

(57) ABSTRACT

An electronic device according to one embodiment of the present invention comprises: a wireless power reception unit for wirelessly receiving power from an external device; a communication unit for transmitting data to the external device; and a processor for controlling the communication unit such that the communication unit transmits data to the external device when power is received from the external device through the wireless power reception unit, and since data is transmitted to the external device on the basis of a signal outputted from the wireless power reception unit, the data can be transmitted to the external device without requiring separate settings.

7 Claims, 11 Drawing Sheets

(51) Int. Cl.
  *H02J 50/10* (2016.01)
  *H04L 67/52* (2022.01)
  *H04B 5/00* (2006.01)
  *H04L 67/10* (2022.01)
  *H02J 7/00* (2006.01)

(52) U.S. Cl.
  CPC .............. *H04L 67/10* (2013.01); *H04L 67/52* (2022.05); *H02J 7/00034* (2020.01); *H04B 5/0031* (2013.01)

(58) Field of Classification Search
  CPC ....... H04L 67/18; H04L 67/10; H04B 5/0037; H04B 5/0031
  USPC ......................................................... 320/108
  See application file for complete search history.

(56) References Cited

U.S. PATENT DOCUMENTS

| | | | |
|---|---|---|---|
| 8,478,816 B2 | 7/2013 | Parks et al. | |
| 8,823,318 B2 | 9/2014 | Liu et al. | |
| 8,825,118 B2 | 9/2014 | Kim et al. | |
| 9,866,281 B2 | 1/2018 | Won et al. | |
| 9,923,603 B2 | 3/2018 | Won et al. | |
| 9,985,695 B2 | 5/2018 | Won et al. | |
| 10,008,875 B1* | 6/2018 | Leabman | H02J 50/80 |
| 10,148,097 B1* | 12/2018 | Leabman | H02J 50/00 |
| 10,243,620 B2 | 3/2019 | Won et al. | |
| 10,581,491 B2 | 3/2020 | Won et al. | |
| 2008/0211458 A1* | 9/2008 | Lawther | H02J 7/025 320/132 |
| 2008/0258679 A1* | 10/2008 | Manico | H02J 7/0042 320/106 |
| 2009/0140692 A1* | 6/2009 | Hwang | H02J 50/10 320/108 |
| 2010/0041333 A1* | 2/2010 | Ungari | H02J 7/00 455/66.1 |
| 2010/0081375 A1 | 4/2010 | Rosenblatt et al. | |
| 2010/0256831 A1* | 10/2010 | Abramo | H02J 7/025 700/286 |
| 2011/0057891 A1* | 3/2011 | Ham | H02J 50/40 345/173 |
| 2012/0091799 A1* | 4/2012 | Rofougaran | H02J 50/10 307/29 |
| 2012/0115549 A1* | 5/2012 | Kim | H02J 50/90 455/566 |
| 2013/0005252 A1* | 1/2013 | Lee | H02J 50/90 307/18 |
| 2013/0044793 A1* | 2/2013 | Haartsen | H04B 5/0025 375/219 |
| 2013/0237148 A1 | 9/2013 | McCann et al. | |
| 2014/0070919 A1* | 3/2014 | Jackson | G08C 17/02 340/5.61 |
| 2014/0141715 A1 | 5/2014 | Smith | |
| 2014/0312833 A1 | 10/2014 | Won et al. | |
| 2015/0106833 A1* | 4/2015 | Kang | H04N 21/441 455/566 |
| 2016/0065005 A1 | 3/2016 | Won et al. | |
| 2016/0087686 A1 | 3/2016 | Won et al. | |
| 2017/0019873 A1* | 1/2017 | Britt | G06Q 30/0261 |
| 2017/0353054 A1* | 12/2017 | Lee | H02J 50/12 |
| 2018/0131413 A1 | 5/2018 | Won et al. | |
| 2019/0199403 A1 | 6/2019 | Won et al. | |
| 2020/0204003 A1* | 6/2020 | Lee | H04B 5/0037 |

FOREIGN PATENT DOCUMENTS

| | | |
|---|---|---|
| KR | 10-2011-0076795 A | 7/2011 |
| KR | 10-2012-0103329 A | 9/2012 |
| KR | 10-2014-0124706 A | 10/2014 |
| KR | 10-2015-0077647 A | 7/2015 |
| WO | WO-2022131443 A1 * | 6/2022 |

* cited by examiner

ELECTRONIC DEVICE TRANSMITTING DATA IN RESPONSE TO RECEIVING POWER WIRELESSLY AND METHOD THEREOF

TECHNICAL FIELD

The present disclosure relates to an electronic device and an electronic device data transmission method, and more particularly to a method for transmitting data between two electronic devices.

DESCRIPTION OF RELATED ART

According to the development of semiconductor technology and wireless communication technology, an electronic device such as a smart phone acquired various functions. The electronic device may store data generated in the electronic device or transmitted from outside in the electronic data, and transmit the data to another electronic device such as a Personal Computer (PC) as needed.

Meanwhile, when transmitting the data in the electronic device to another electronic device such as a PC, the data may be transmitted in a wired manner by connecting two devices, or may be transmitted in a wireless manner by using a wireless communication. In order to transmit the data using the wireless communication, a setting process called pairing is required to connect two devices.

DETAILED DESCRIPTION

Problem to be Solved

There is a problem that the procedure of the pairing process, which is connecting two devices in a wireless manner, is complicated, and thus it is not easy for a user to perform the pairing. The present disclosure provides a method for transmitting data without such additional setting process.

Means of Solving the Problems

According to an embodiment, there is provided an electronic device including a wireless power receiver configured to receive power wirelessly from an external device, a communicator configured to transmit data to the external device, and a processor configured to, in response to power being received from the external device through the wireless power receiver, control the communicator to transmit data to the external device. The processor may control the communicator to transmit data to the external device based on a signal output from the wireless power receiver. The communicator may transmit data using a TransferJet method. The data to be transmitted to the external device may be identified by a user in advance, before the wireless power receiver receives power.

The electronic device further includes a display, and the data to be transmitted to the external device may be selected by a user through the display. The data may include security information.

According to another embodiment, there is provided an electronic device including a display, a communicator configured to perform a communication with an Internet of Things (IoT) device, a wireless power receiver configured to receive power wirelessly, and a processor configured to, in response to power being received from the wireless power receiver, identifies a location of a user based on first data received from an IoT device and control the communicator to transmit second data to the IoT device disposed near the location of the user. A location of the IoT device may be identified based on a signal received from the IoT device. The first data may be generated based on a movement of a user. The second data may be a message received from outside the electronic device. The processor may control the display to display the second data on the display in response to power not being received in the wireless power receiver.

According to another embodiment, there is provided a data transmitting method of an electronic device, the method including selecting data to be transmitted to an external device according to a user input, receiving power wirelessly from the external device, and transmitting the selected data to the external device as power is received wirelessly. The method may further include receiving a request to provide security information stored in the electronic device from the external device, and transmitting the security information to the external device.

According to another embodiment, there is provided a data transmitting method of an electronic device, including: receiving first data from an IoT device, receiving power wirelessly, identifying a location of a user based on the first data, and transmitting second data to the IoT device near the identified location of the user. A location of the IoT device may be identified based on a signal received from the IoT device. The first data may be generated based on a movement of a user. The second data may be a message received from outside the electronic device.

The method may further include displaying the second data on a display in response to power not being received wirelessly.

Effects of the Invention

According to an embodiment, the complicated pairing process may be simplified so as to transmit data without additional connection.

DETAILED DESCRIPTION

Figure 1:
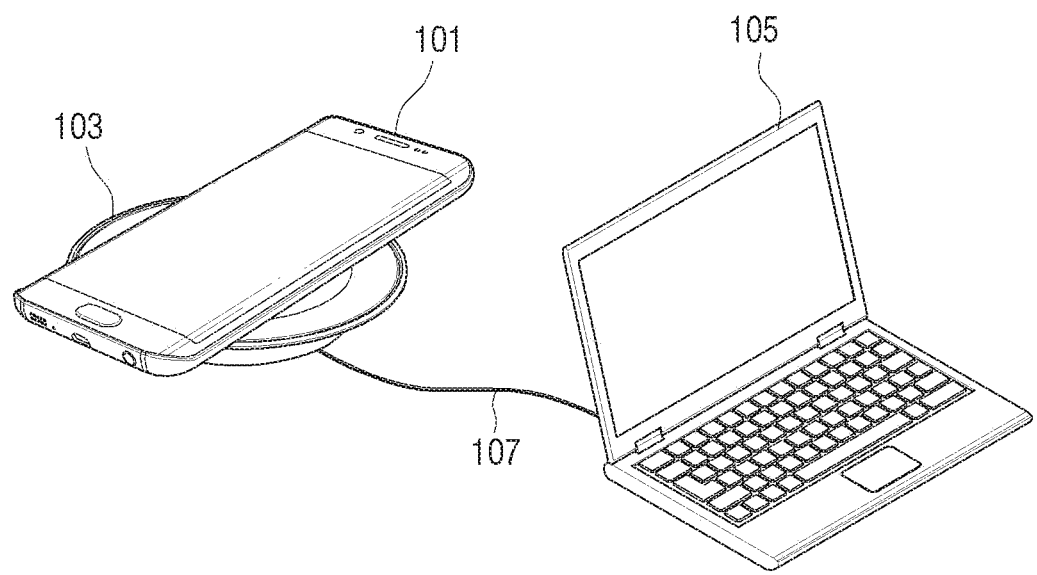
FIG. 1 is a system diagram according to an embodiment.

The above and other aspects, features, and advantages of certain embodiments of the present disclosure will be more apparent from the following description taken in conjunction with the accompanying drawings. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

If it is described that a certain element (e.g., first element) is "(operatively or communicatively) coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) present between one element and another element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the present disclosure belongs. The terms that are used in the present disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the present disclosure should not be interpreted as excluding the embodiments of the present disclosure.

An electronic device according to various embodiments of the present disclosure may include, for example, at least one of a smart phone, a tablet PC (Personal Computer), a mobile phone, a video phone, an e-book reader, a desktop PC (Personal Computer), a laptop PC (Personal Computer), a net book computer, a workstation, a server, a PDA (Personal Digital Assistant), a PMP (Portable Multimedia Player), an MP3 player, a mobile medical device, a camera, and a wearable device. According to various embodiments, the wearable device may include at least one of an accessory type (e.g.: watch, ring, bracelet, ankle bracelet, necklace, glasses, contact lens, or head-mounted-device (HMD)), fabric or cloth-embedded type (e.g.: e-cloth), body-attached type (e.g.: skin pad or tattoo), or bioimplant circuit (e.g.: implantable circuit).

In another embodiment, an electronic device may be a home appliance. The electronic device may include, for example, at least one of television, digital video disk (DVD) player, audio, refrigerator, air-conditioner, cleaner, oven, microwave, washing machine, air cleaner, set top box, home automation control panel, security control panel, TV box (ex: Samsung HomeSyncM, Apple TV™, or Google TV™), game console (ex: Xbox™, PlayStation™), e-dictionary, e-key, camcorder, or e-frame.

In another embodiment, an electronic device may include various medical devices (ex: various portable medical measuring devices (blood glucose monitor, heart rate monitor, blood pressure measuring device, or body temperature measuring device, etc.), magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle info-tainment device, e-device for ships (ex: navigation device for ship, gyrocompass, etc.), avionics, security device, head unit for vehicles, industrial or home-use robots, drone, ATM of financial institutions, point of sales (POS) of shops, or internet of things device (ex: bulb, sensors, sprinkler, fire alarm, temperature controller, streetlight, toaster, sporting goods, hot water tank, heater, boiler, etc.).

According to some embodiments, an electronic device may include at least one of furniture, a part of a building/construction or vehicle, electronic board, electronic signature receiving device, projector, or various measuring devices (ex: water, electricity, gas, or wave measuring device, etc.). In various embodiments, the electronic device may be a combination of one or more of the above-described devices. In a certain embodiment, the electronic device may be a flexible electronic device. Further, the electronic device according to the embodiments of the present disclosure is not limited to the above-described devices, but may include new electronic devices in accordance with the technical development.

Hereinafter an electronic device according to various embodiments will be described with reference to the accompanying drawings. In this disclosure, the term "a user" may indicate a person using the electronic device, a person who is sensed by a device or who causes an event for a device. The number of the user may be a plural.

FIG. 1 is a system diagram according to an embodiment.

Referring to FIG. 1, an electronic device 101, an external device 103, a Personal Computer (PC) 105 are illustrated. The electronic device 101 includes a wireless power receiver, and may charge a battery included in the electronic device 101 by receiving power wirelessly from the external device 103. The electronic device 101 includes a processor, and an event may occur if power is received from an external device through the wireless power receiver. The processor included in the electronic device 101 may control a communicator of the electronic device 101 to transmit data to the external device 103 if an event occurs. That is, the communicator of the electronic device 101 may transmit data to the external device 103 based on the signal output from the wireless power receiver. For example, if power is received wirelessly from the external device 103, the electronic device 101 may output a signal to the processor according thereto. The processor is triggered by the signal output from the wireless power receiver, and may control the communicator to output data to the external device 103.

The external device 103 may be, for example, a wireless charger. The external device 103 may include a space on which the electronic device 101 may be put. The external device 103 may be connected to the PC 105 through a USB cable 107, and the external device 103 may receive power from the PC 105 through the USB cable 107 or transmit data to the PC 105 through the USB cable 107. The external device 103 may include a communicator which may receive data transmitted from the electronic device 101. In addition, the external device 103 and the PC 105 may be connected wirelessly.

Figure 2:
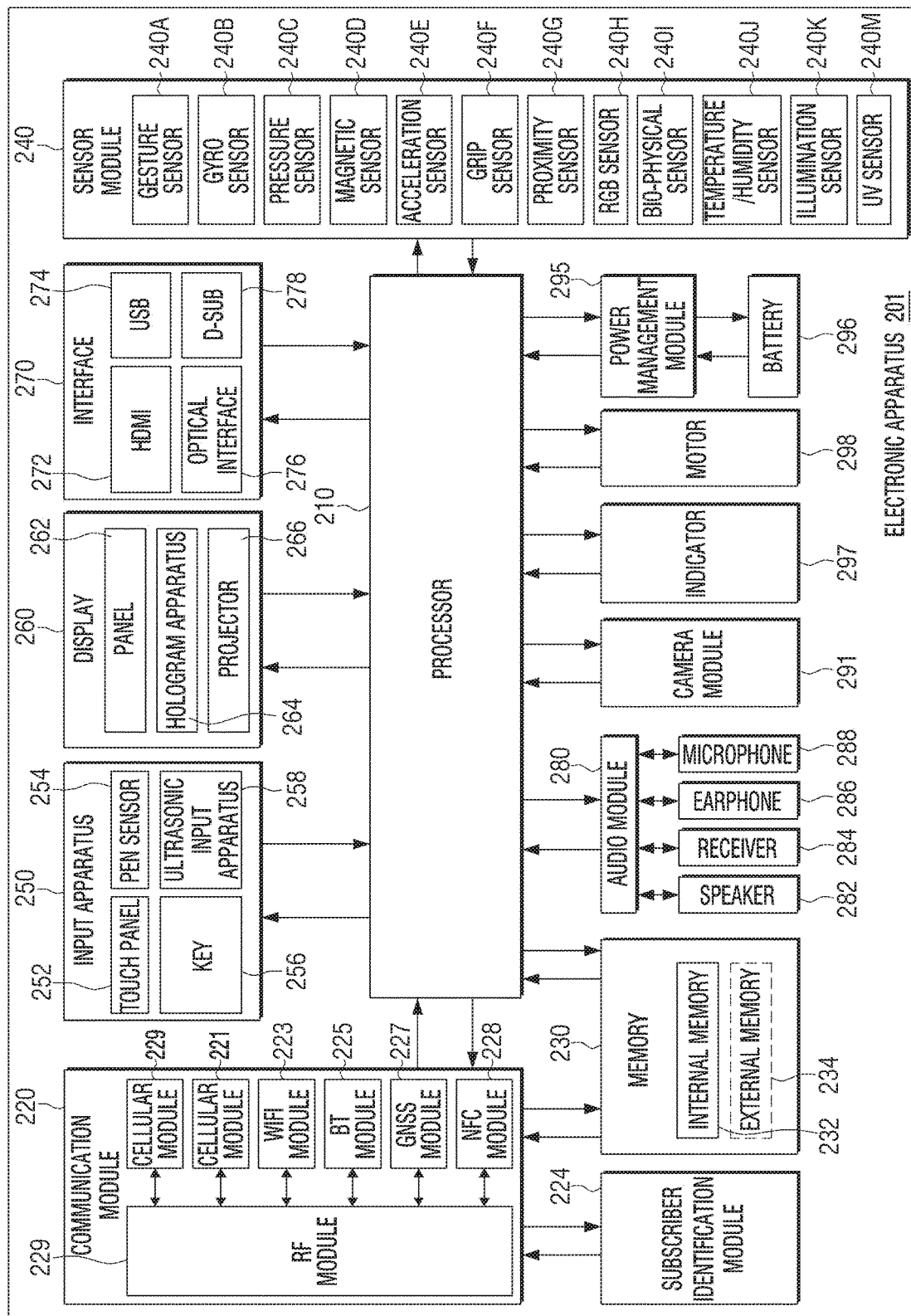
FIG. 2 is a block diagram illustrating an electronic device according to an embodiment.

FIG. 2 is a detailed block diagram illustrating an electronic device 201 according to an embodiment.

The electronic device 201 may include at least one processor 210 (e.g. an application processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control, for example, a number of hardware or software elements connected to the processor 210 by driving an operating system or an application program, and perform various data processing and calculations. The processor 210, for example, may be realized as a system on chip (SoC). According to an embodiment, the processor 210 may further include a graphic processing unit (GPU) and/or an image signal processor. The processor 210 may include at least some among elements illustrated in FIG. 2 (e.g., cellular module 221). The processor 210 may load and process a command or data received from at least one of other elements (e.g., nonvolatile memory) to a volatile memory, and store various data in the nonvolatile memory.

Figure 3:
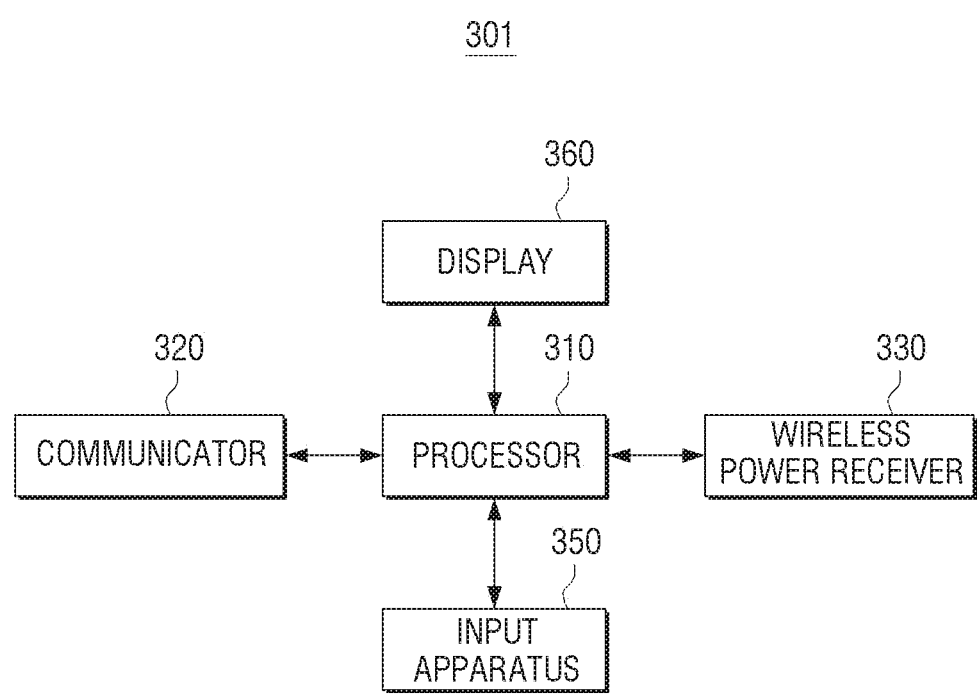
FIG. 3 is a detailed block diagram illustrating an electronic device according to an embodiment.

The communication module 220 may have the same or similar configuration as the communicator 320 of FIG. 3. The communication module 220 may include, for example, a cellular module 221, a WiFi module 223, a Bluetooth module 225, a GNSS module 227 (e.g., a GPS module, a Glonass module, a Beidou module, or a Galileo module), an NFC module 228, a TransferJet module 229, and a radio frequency (RF) module 229.

The cellular module 221, for example, may provide a voice call, a video call, a text service, or internet service via a communication network. According to an embodiment, the cellular module 221 may perform a discrimination and an authentication for the electronic device 201 in a communication network by using a subscriber identification module 224 (e.g., SIM card). According to an embodiment, the cellular module 221 may perform at least a part of the functions which can be provided by the processor 210. According to an embodiment, the cellular module 221 may include a communication processor (CP).

Each of the WiFi module 223, the Bluetooth module 225, the GNSS module 227 or the NFC module 228, for example, may include a processor to process data which are transmitted/received through a corresponding module. According to an embodiment, at least some of (e.g., at least two) the cellular module 221, WiFi module 223, Bluetooth module 225, GNSS module 227 and NFC module 228 may be included in a single integrated chip (IC) or an IC package.

An RF module 229, for example, may transmit/receive a communication signal (e.g., an RF signal). The RF module 229, for example, may include a transceiver, a power amp module (PAM), a frequency filer, a low noise amplifier (LNA), or an antenna and the like. According to another embodiment, at least one of the cellular module 221, WiFi module 223, Bluetooth module 225, GNSS module 227 and NFC module 228 may transmit and receive the RF signal through a separate RF module.

The subscriber identification module 224, for example, may include a card including a subscriber identification module and/or an embedded SIM, and unique identification information (e.g., integrated circuit card identifier (ICCID)) or subscriber information (e.g., international mobile subscriber identity (IMSI)).

A memory 230 (e.g., a memory 130), for example, may include an embedded memory 232 or an exterior memory 234. The embedded memory 232, for example, may include at least one of a volatile memory (e.g., dynamic RAM (DRAM), static RAM (SRAM), or synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM), a flash memory (e.g., NAND flash or NOR flash), a hard drive, or a solid state drive (SSD).

The external memory 234 may include a flash drive, for example, a compact flash (CF), a secure digital (SD), a micro secure digital (Micro-SD), Mini-SD, an extreme digital (XD), a multi-media card (MMC) or a memory stick and the like. The external memory 234 may be connected functionally and/or physically to the electronic device 201 through a variety of interfaces.

The sensor module 240, for example, may measure physical quantity or sense the operation status of the electronic device 201, and may convert the measured or sensed information to an electrical signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biosensor 240I, a temperature-humidity sensor 240J, an illuminance sensor 240K, and an ultra violet (UV) sensor 240M. Additionally or alternatively, the sensor module 240, for example, may include an E-nose sensor, an electrocardiogram (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit to control at least one or more sensors therein. According to an exemplary embodiment, the electronic device 201 may further include a processor configured to control the sensor module 240 as part of the processor 210 or additionally, and control the sensor module 240 while the processor 210 is in a sleeping state.

The input device 250, for example, may include a touch panel 252, a (digital) pen sensor 254, a key 256 or an ultrasonic input apparatus 258. The touch panel 252 may use, for example, at least one of electrostatic type, pressure sensitive type, infrared type, and an ultraviolet type. In addition, the touch panel 252 may further include a control circuit. The touch panel 252 may further include a tactile layer to provide a tactile response to a user.

The (digital) pen sensor 254, for example, may be part of a touch panel or include a separate detection sheet. The key 256, for example, may include a physical button, an optical key, or a keypad. The ultrasonic input device 258 may detect ultrasonic waves generated by an input tool, via a microphone (e.g., a microphone 288), and may check the data corresponding to the detected ultrasonic waves.

The display 260 may include a panel 262, a hologram apparatus 264, or the projector 266. Especially, the display 260 may have the same or similar configuration as a display 360 of FIG. 3. The panel 262, for example, may be implemented flexibly, transparently, and in a wearable manner. A panel 262 may be implemented in a single module with a touch panel 252. The hologram apparatus 264 may display a stereoscopic image in the air using interference of light. The projector 266 may project light onto a screen to display an image. The screen may, for example, be located within or outside the electronic apparatus 201. According to an embodiment, the display 260 may further include a control circuit to control the panel 262, the hologram apparatus 264, or the projector 266.

The interface 270, for example, may include a high-definition multimedia interface (HDMI) 272, a universal serial bus (USB) 274, an optical interface 276, or a D-subminiature 278. Additionally or alternatively, the interface 270, for example, may include a mobile high-definition link (MHL) interface, a secure digital (SD) card/multi-media card (MMC) interface, or Infrared data association (IrDA) standard interface.

The audio module 280, for example, may convert sound and an electrical signal in bilateral directions. The audio module 280, for example, may process sound information input or output through a speaker 282, a receiver 284, an earphone 286, or a microphone 288.

The camera module 291, for example, is a device which may capture a stop image and a moving image, and may include at least one of an image sensor (e.g., a front sensor or a rear sensor), lens, an image signal processor (ISP), or a flash (e.g., LED or xenon lamp, etc.) according to an embodiment.

The power management module 295, for example, may manage the power of the electronic device 201. According to an embodiment, the power management module 295 may include a power management integrated circuit (PMIC), a charger integrated circuit (charger IC), or battery or fuel gauge. The PMIC may use a wired and/or wireless charging method. The wireless charging method, for example, may include a magnetic resonance method, a self-induction method, or an electromagnetic wave method, and may further include an additional circuit for wireless charging, for example, a coil loop, a resonant circuit, or a rectifier, etc. The battery gauge, for example, may measure remains of a battery 296, voltage when charging, a current, or temperature. The battery 296, for example, may include a rechargeable battery and/or a solar battery.

The indicator 297 may display the specific status of the electronic device 201 or a part thereof (e.g., a processor 210), for example, booting status, message status, or charging status and the like. The motor 298 may change an electric signal into a mechanical vibration, and generate a vibration or a haptics effect, etc. Although not illustrated, the electronic device 201 may include a processor for supporting a mobile TV (e.g., GPU). The processor for supporting the mobile TV may process, for example, media data according to the standards such as a digital multimedia broadcasting (DMB), digital video broadcasting (DVB), or mediaFlo™.

Each element described in the embodiment may consist of one or more than one components, and the name of the components may vary depending on the type of electronic devices. In various embodiments, an electronic device may include at least one among elements which are described in the embodiment, and some of the elements may be omitted or other elements may be added. In addition, some of the elements of an electronic device according to various embodiments may be combined to form a single entity which performs the same functions as those elements before being combined.

FIG. 3 is a block diagram of an electronic device 301 according to an embodiment.

Referring to FIG. 3, the electronic device 301 may include a communicator 320, a wireless power receiver 330, an inputter 350, a display 360 and a processor 310.

The communicator 320 may transmit data to an external device. The communicator 320, for example, may communicate with an external device or another device by being connected to network through a wireless communication or a wired communication. The wireless communication is, for example, a cellular communication protocol, and may use, for example, at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). In addition, the wireless communication may include, for example, a short distance communication. The short distance communication may include, for example, at least one of WiFi, Bluetooth, near field communication (NFC) and TransferJet. The wired communication may include, for example, at least one of universal serial bus (USB), high definition multimedia interface (HDMI), recommended standard-232 (RS-232), or plain old telephone service (POTS). A network may include a telecommunications network, for example, at least one of a computer network (PC network) (e.g., LAN or WNA), Internet, or a telephone network.

A communicator 320 may transmit data to an external device based on a signal output from the wireless power receiver 330. The data may include security information. The data to be transmitted to an external device may be decided in advance by a user before the wireless power receiver 330 receives power. The communicator 320 may receive the first data from an IoT device. The first data may be generated based on the movement of a user.

The inputter 350 may include, for example, a touch panel, a (digital) pen sensor, a key, or an ultrasonic input device. A user may select data to be transmitted to an external device through an inputter.

The display 360 may include, for example, a liquid crystal display (LCD), a light-emitting diode (LED) display, an organic light-emitting diode (OLED) display, a microelectromechanical systems (MEMS) display, or an electronic paper display.

In the display 360, the list of data to be transmitted to an external device may be displayed, and the electronic device 301 may receive a selection of the data to be transmitted to the external device from a user through the display 360.

If power is received from the external device through the wireless power receiver 330, the processor 310 may control the communicator 320 to transmit data to the external device. In addition, if power is received from the wireless power receiver 330, the processor 310 may identify the location of a user based on the first data received from the IoT device, and control the communicator 320 to transmit the second data to the IoT device disposed at a surrounding area of a user.

The wireless power receiver 330 may receive power wirelessly. The wireless power receiver 330 may receive power from a wireless power transmitter of an external device wirelessly and charge the battery of the electronic device 301. The wireless power receiver 330 may receive power wirelessly using one or more than one wireless power transferring method. For example, the wireless power receiver 330 may receive power in an induction coupling method based on a self-induction effect. Alternatively, the wireless power receiver 330 may receive power in a resonance coupling method based on an electro magnetic resonance effect according to a wireless power signal of a specific frequency. The induction coupling method refers to receiving power through that a current is induced from one coil to the coil at the other side through a changing magnetic according to the self-induction effect. The resonance coupling method refers to that a resonance occurs in the wireless power receiver according to the wireless power signal transmitted from the wireless power transmitting device, and power is transmitted to the wireless power receiver from the wireless power transmitting device according to the resonance effect.

Figure 4:
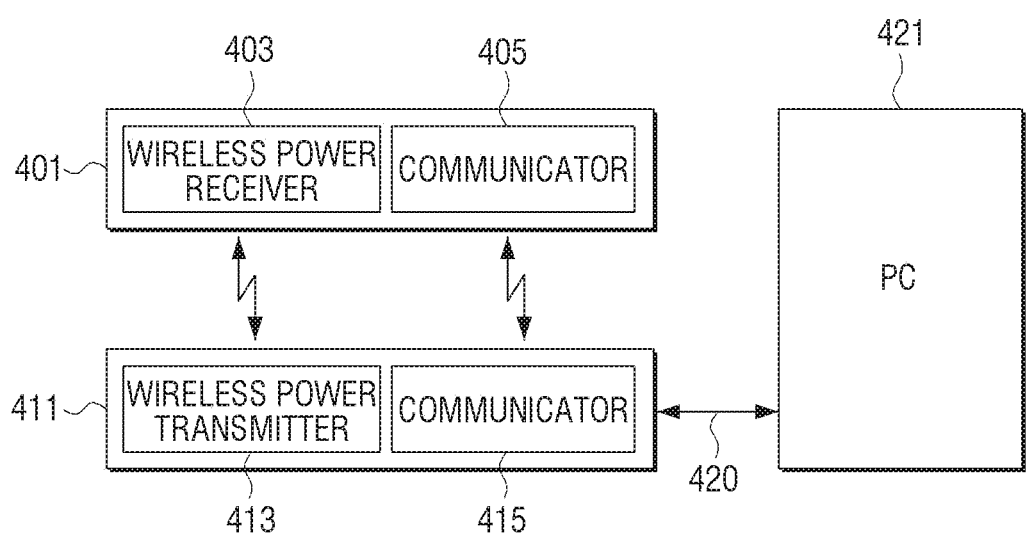
FIGS. 4 and 5 are views illustrating an example that an electronic device transmits data to a surrounding device through a wireless charger when receiving power wirelessly.
Figure 5:
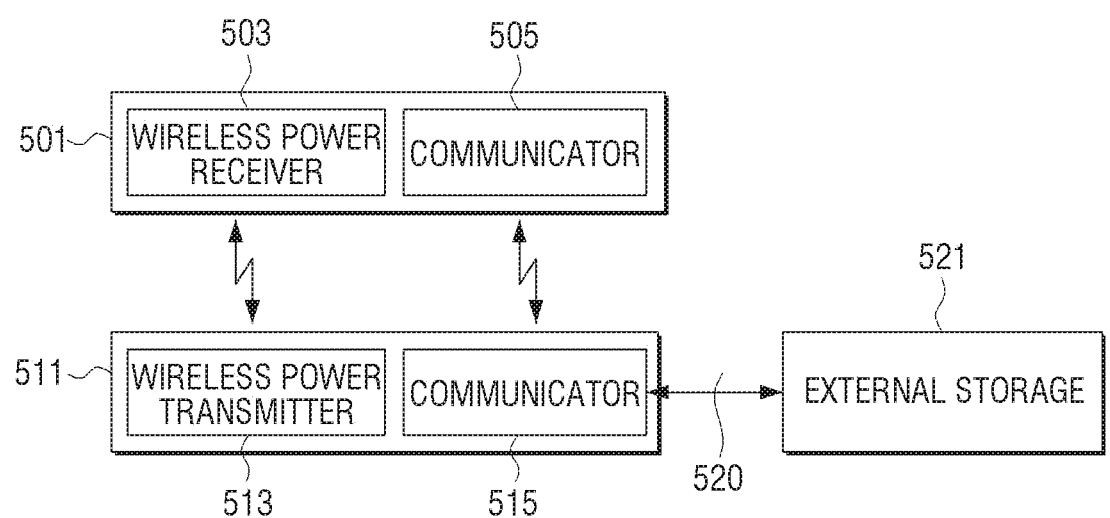

FIGS. 4 and 5 are views illustrating an example that an electronic device transmits data to a surrounding device through a wireless charger when receiving power wirelessly.

Referring to FIG. 4, the electronic device 401, the wireless charger 411, and a surrounding device 421 are illustrated. The surrounding device 421 may be, for example, a personal computer (PC), but it is not limited thereto. The wireless charger 411 may be connected to the PC 421 through a USB cable 420. The PC 421 may provide power to the wireless charger 411 through a USB cable 420.

The PC 421 may receive data from the wireless charger 411 through the USB cable 420. That is, the wireless charger 411 may receive power for driving the wireless charger 411 from the PC 421 through the USB cable 420, and transmit data received from the electronic device 401 to the PC 421 through the USB cable 420.

The wireless charger 411 may include a wireless power transmitter 413 and the communicator 415. The wireless power transmitter 413 may supply power to the electronic device 401. The communicator 415 may receive data from the electronic device 401 and transmit the received data to the PC 421 through the USB cable 420.

The electronic device 401 may be, for example, a smartphone, but it is not limited thereto. The electronic device 401 may include a wireless power receiver 403 and a communicator 405. The electronic device 401 may include a battery (not illustrated). The wireless power receiver 403 may receive power transmitted from the wireless charger 411, and charge a battery of the electronic device 401. If the power is received wirelessly, the electronic device 401 may generate an event, and transmit data to the wireless charger 401 through the communicator 405 according to the event. The communicator 405 may be a proximity data transmitting module, for example, may be a TransferJet module. The TransferJet is a short distance wireless transmitting technology, with which data may be transmitted in a non-contact method. The highest transmitting speed of the TransferJet is 560 Mbps, and an actual speed thereof is 370 Mbps. The TransferJet does not require a complicated setting and an access point. If a user puts the electronic device 401 on the wireless charger 411 in order to charge the electronic device 401, the electronic device 401 may detect an event of charging power wirelessly, and transmit data to the wireless charger 411 in response to the detection of the event. Here, the data to be transmitted to the wireless charger 411 may be identified by a user in advance before power is received wirelessly. The electronic device 401 may display the data to be transmitted to the wireless charger 411 on a display (not illustrated), and may receive the selection of the data to be transmitted to the wireless charger 411 from a user. For example, the electronic device 401 may display the data list to be transmitted to the wireless charger 411 on the display. If a user selects at least one data list displayed on a display, the electronic device 401 may transmit at least one data selected at the time when power is received wirelessly to the wireless charger 411. The wireless charger 411 has been suggested as an example in the above, but it is not limited thereto. The wireless charger 411 may transmit data received from the electronic device 401 to the PC 421 through the USB cable 420.

Referring to FIG. 5, the electronic device 501, a wireless charger 511, and a surrounding device 521 are illustrated. The surrounding device 521 may be, for example, an external storing device, but it is not limited thereto. The wireless charger 511 may be connected to an external storing device 521 through a USB cable 520. The external storing device 521 may provide power to the wireless charger 511 through the USB cable 520.

The external storing device 521 may receive data from the wireless charger 511 through the USB cable 520. That is, the wireless charger 511 may receive power for driving the wireless charger 511 from the external storing device 521 through the USB cable 520, and transmit data received from the electronic device 501 to the external storing device 521 through the USB cable 520.

The wireless charger 511 may include the wireless power transmitter 513 and the communicator 515. The wireless power transmitter 513 may provide power to the electronic device 501. The communicator 515 may receive data from the electronic device 501 and transmit the received data to the external storing device 521 through the USB cable 520.

The electronic device 501 may be, for example, a smart phone, but it is not limited thereto. The electronic device 501 may include the wireless power receiver 503 and the communicator 505. The electronic device 501 may include a battery (not illustrated). The wireless power receiver 503 may receive power transmitted from the wireless charger 511 and charge the battery of the electronic device 501. If the power is received wirelessly, the electronic device 501 may generate an event and if the event occurs, the electronic device 501 may transmit the data to the wireless charger 511 through the communicator 505. The communicator 505 may be a proximity data transmitting module. For example, the communicator 505 may be a TransferJet module. The TransferJet is a short distance wireless transmitting technology, with which data may be transmitted in a non-contact method. The highest transmitting speed of the TransferJet is 560 Mbps, and an actual speed thereof is 370 Mbps. The TransferJet does not require a complicated setting and an access point. If a user puts the electronic device 501 on the wireless charger, the electronic device 501 may detect an event of charging power wirelessly, and transmit data to the wireless charger 511 in response according thereto. Here, the data to be transmitted to the wireless charger 511 may be identified by a user in advance before power is received wirelessly. The electronic device 501 may display the data to be transmitted to the wireless charger 511 on a display (not illustrated), and may receive the selection of the data to be transmitted to the wireless charger 511 from a user. For example, the electronic device 501 may display the data list to be transmitted to the wireless charger 511 on the display. If a user selects at least one data list displayed on a display, the electronic device 501 may transmit at least one data selected at the time when power is received wirelessly to the wireless charger 511. The wireless charger 511 has been suggested as an example in the above, but it is not limited thereto. The wireless charger 511 may transmit data received from the electronic device 501 to the external storing device 521 through the USB cable 520.

Figure 6:
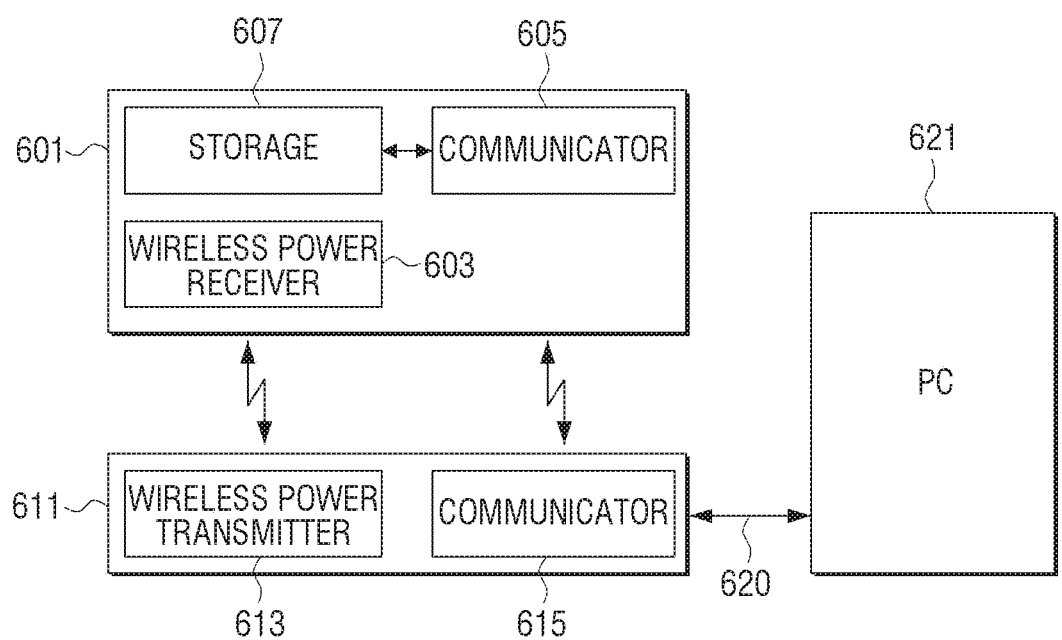
FIG. 6 is a view illustrating an example that security information stored in an electronic device is transmitted to a PC through a wireless charger.

FIG. 6 is a view illustrating an example that security information stored in an electronic device is transmitted to a PC through a wireless charger.

Referring to FIG. 6, the electronic device 601, a wireless charger 611, and a surrounding device 621 are illustrated. The surrounding device 621 may be, for example, a PC, but not limited thereto. The wireless charger 611 may be connected to the PC 621 through a USB cable 620. The PC 621 may provide power to the wireless charger 610 through a USB cable 620.

The PC 621 may receive data from the wireless charger 611 through the USB cable 620. That is, the wireless charger 611 may receive power for driving the wireless charger 611 from the PC 621 through the USB cable 620, and transmit the data received from the electronic device 601 to the PC 621 through the USB cable 620. Here, the data may be security information.

The wireless charger 611 may include a wireless power transmitter 613 and the communicator 615. The wireless power transmitter 613 may supply power to the electronic device 601. The communicator 615 may receive security information from the electronic device 601 and transmit the received security information to the PC 621 through the USB cable 620. The PC 621 may access internet website or have a financial trade which requires security information by using received security information. For example, if a user accesses a shopping site and purchases goods using the PC 621, the security information may be required. The PC 721 may receive the security information from the electronic device 601 through the wireless charger 611 and purchase goods.

The electronic device 601 may be a smart phone, but it is not limited thereto. The electronic device 601 may include a wireless power receiver 603, a communicator 605, and a storage 607. The electronic device 601 may include a battery (not illustrated). The wireless power receiver 603 may receive power transmitted from the wireless charger 611, and charge a battery of the electronic device 601. If the power is received wirelessly, the electronic device 601 may generate an event, and if the event occurs, the electronic device 601 may transmit the security information stored in the storage 607 to the wireless charger 601 through the communicator 605. The communicator 605 may be a proximity data transmitting module, for example, may be a TransferJet module. The TransferJet is a short distance wireless transmitting technology, with which data may be transmitted in a non-contact method. The highest transmitting speed of the TransferJet is 560 Mbps, and an actual speed thereof is 370 Mbps. The TransferJet does not require a complicated setting and an access point. If a user puts the electronic device 601 on the wireless charger 611, the electronic device 601 may detect an event of charging power wirelessly, and transmit the security information to the wireless charger 611 in response to the detection of the event. Here, the security information to be transmitted to the wireless charger 611 may be identified by a user in advance, before power is received wirelessly. The electronic device 601 may display an inquiry screen which asks whether to transmit the security information on a display (not illustrated) while a wireless charging status, and receive the user input regarding whether to transmit the security information, from a user. If it is selected that the security information is to be transmitted, the electronic device 601 may transmit the security information to the wireless charger 611.

Figure 7:
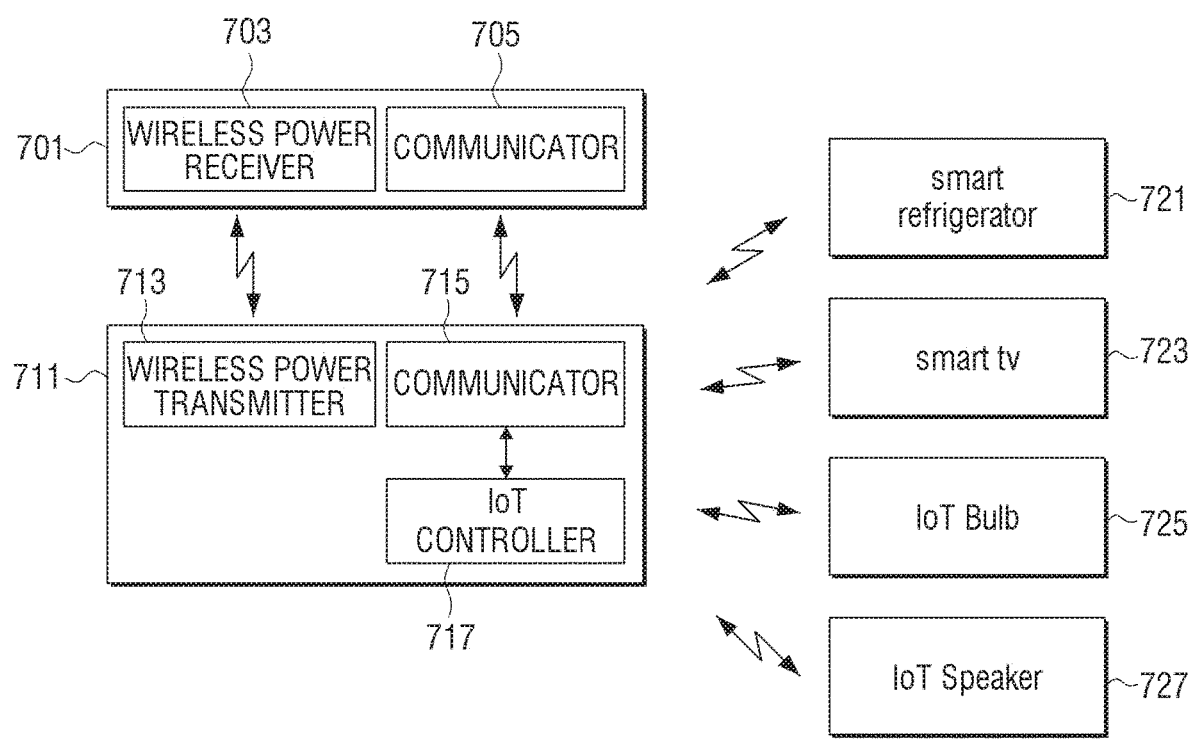
FIG. 7 is a view illustrating an example that an electronic device transmits a message received from outside to an IoT device when being charged wirelessly.

FIG. 7 is a view illustrating an example that an electronic device transmits a message received from outside to an IoT device via a wireless charger.

Referring to FIG. 7, an electronic device 701, a wireless charger 711, and a plurality of IoT devices 721, 723, 725, and 727 are illustrated.

The electronic device 701 may be a smartphone, but it is not limited thereto. The electronic device 701 may include a wireless power receiver 703 and a communicator 705. The electronic device 701 may include a battery (not illustrated). The wireless power receiver 703 may receive the power transmitted from the wireless charger 711 and charge a battery of the electronic device 701. If power is charged wirelessly, the electronic device 701 may generate an event, and when the event occurs, the electronic device 701 may transmit data to the wireless charger 711 through the communicator 705. The data may be a message received from outside or an informing information occurs in an interior. For example, the data may be a text message, an e-mail or an alarm message.

The communicator 705 may be a proximity data transmitting module, for example, a TransferJet module. The TransferJet is a short distance wireless transmitting technology, with which data may be transmitted in a non-contact method. The highest transmitting speed of the TransferJet is 560 Mbps, and an actual speed thereof is 370 Mbps. The TransferJet does not require a complicated setting and an access point. If a user puts the electronic device 701 on the wireless charger 711, the electronic device 701 may detect an event of charging power wirelessly, and transmit data (e.g., an informing information) to the wireless charger 711 in response to the detection of the event.

The wireless charger 711 may include a wireless power transmitter 713, a communicator 715, and an IoT controller 717. The wireless power transmitter 713 may provide power to the electronic device 701. The communicator 715 may receive data from the electronic device 701 and transmit the received data to an IoT device. The IoT controller 717 may identify an indoor or surrounding IoT devices 721, 723, 725, and 727, and transmit data to the IoT devices 721, 723, 725, and 727 in a wired or wireless manner. Here, the location of the IoT devices 721, 723, 725, and 727 may be identified based on the data received from an IoT sensor disposed at each location. The IoT device may be located at the peripheral area of the IoT sensor. If a movement of a man or a device is detected, the IoT sensor may output a signal. The IoT controller 717 may identify the location of the IoT device located at the peripheral area of the IoT sensor based on the signal received from the IoT sensor and the signal received from the IoT device. For example, if IoT sensors which may detect the movement of a man is installed in a bedroom, a living room, a kitchen, and a bathroom in a house, and if the IoT device is located at a peripheral area of the IoT sensor, the IoT controller 717 may identify the IoT device located at the peripheral area of the IoT sensor. The wireless charger 711 may identify the location of the IoT device located in a house through the IoT controller, and transmit the data received from the electronic device 701 to the IoT device located at the space in which a user is located. If the user puts the electronic device 701 on the wireless charger, the charging of the electronic device 701 starts. If a text message is received from outside while the electronic device 701 is charged, the electronic device 701 may transmit a text message to the wireless charger 711, and the wireless charger 711 may re-send the received text message to the IoT device located at the peripheral area of the IoT sensor which detected the movement of a user. The IoT device may display the received text message on a display. For example, if a user puts the electronic device 701 on the wireless charger 711 in a bedroom, and moves to a living room, if a text message is received in the electronic device 701, the electronic device 701 may transmit the text message to the wireless charger 711. The wireless charger 711 may transmit the text message to a smart TV 723 in the living room based on the movement of the user sensed in the living room, and the smart TV 723 may display the received text message on a display. In addition, if the user moves to a kitchen, the wireless charger 711 may transmit the received text message to the IoT device (e.g., a smart refrigerator 721) in the kitchen based on the movement of the user sensed at the kitchen.

Figure 8:
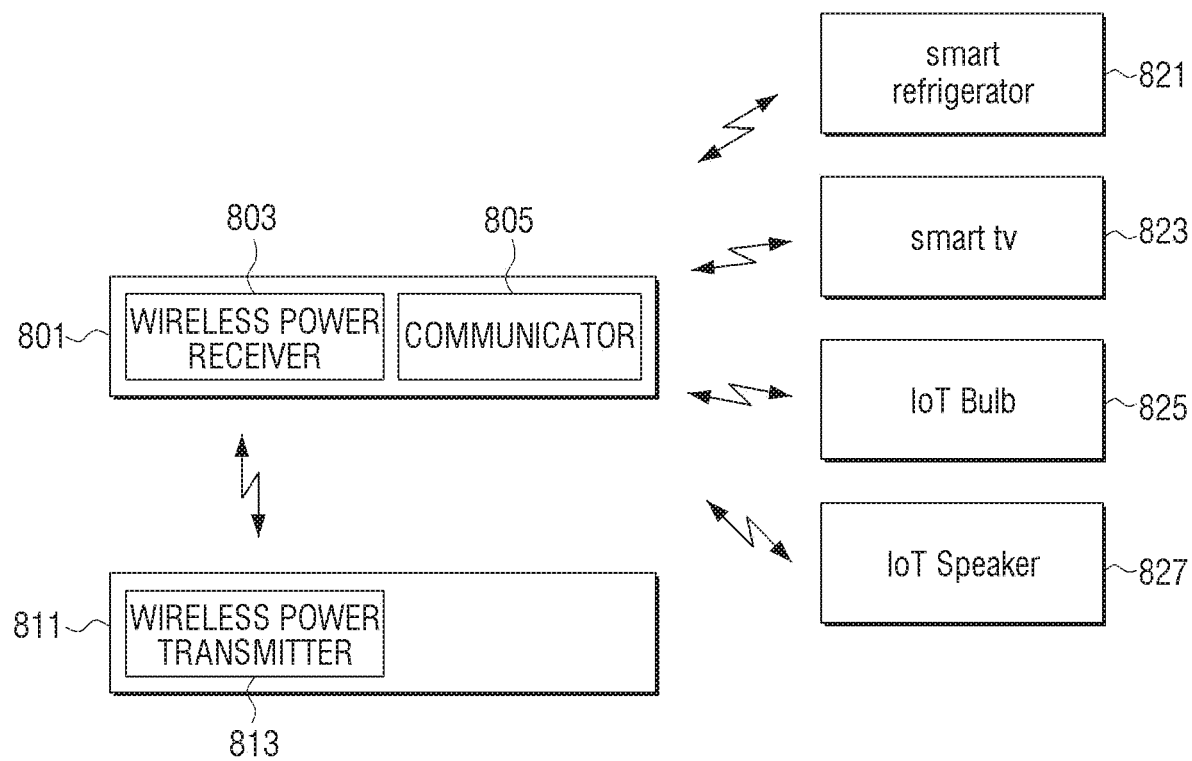
FIG. 8 is a view illustrating an example that an electronic device transmits a message received from outside to an IoT device when being charged wirelessly.

FIG. 8 is a view illustrating an example that an electronic device transmits a message received from outside to an IoT device when being charged wirelessly.

Referring to FIG. 8, an electronic device 801, a wireless charger 811, and IoT devices 821, 823, 825, and 827 are illustrated.

The IoT devices 821, 823, 825, and 827 may be electronic devices disposed inside a house. For example, the IoT device may be a smart refrigerator 821, a smart TV 823, an IoT bulb 825, and an IoT speaker 827. The IoT devices 821, 823, 825, and 827 have a communication function and may transmit ID information of IoT device to the electronic device 801. In addition, the IoT devices 821, 823, 825, and 827 may include an IoT sensor. The IoT sensor includes a sensor and a communicator, detects the movement of a man or a device, and transmit the first data to the electronic device 801. The first data may be generated based on the movement of a man.

The IoT sensor may be located in a specific location in a house. For example, the IoT sensor may be disposed at a door, a living room, a bedroom, a kitchen, and a bathroom. The IoT sensor may be included in an IoT device, but it is merely an embodiment, and the IoT sensor may be disposed around the IoT device. Accordingly, the electronic device 801 may decide the location of the IoT device based on the signal received from the IoT sensor and the IoT device.

If the movement of a man or a device is detected, the IoT sensor may output the first data. If the IoT sensor is installed in a specific space in a house and the IoT device is installed near the IoT sensor, the electronic device 801 may identify the location of the IoT device installed in the house and transmit the second data to the IoT device. For example, if a smart TV 823 located in a living room operates within certain time after a movement of a man is detected at an IoT sensor in the living room, the electronic device 801 may identify that the smart TV 823 is located at a peripheral area of the IoT sensor in the living room. The electronic device 801 receives the signal output from the IoT sensor and the IoT device and calculates the correlation of at least two IoT devices or IoT sensors, and continuously generates an IoT device map from this. The location of the IoT sensor and the IoT device disposed in a house may be displayed on the IoT device map. The electronic device 801 may identify the location of the IoT sensor and the IoT device by referring to the IoT device map, and transmit the second data to the IoT device located at the location in which a movement of a user is detected.

The electronic device 801 may be a smart phone, but it is not limited thereto. The electronic device may include a display (not illustrated), a processor (not illustrated), a wireless power receiver 803, and a communicator 805. The electronic device 801 may include a battery (not illustrated). The wireless power receiver 803 may receive power transmitted from a wireless charger 811, and charge the battery of the electronic device 801. If power is received wirelessly, the electronic device 801 may generate an event, and if the event occurs, the electronic device 801 may transmit the second data to the IoT device through the communicator 705. The second data may be a message received from outside of the electronic device, or an informing information generated in the electronic device. For example, the second data may be a text message, an e-mail or an informing message. Alternatively, the second data may be a file selected by a user in advance. The second data may be selected by a user before starting a wireless charging. The electronic device 801 may display a list of the second data to be transmitted to the IoT device on a display, and transmit the second data selected by a user to the IoT device.

If power is not received in the wireless power receiver 803, the electronic device 801 may display the second data received from outside on the display of the electronic device 801. That is, if a wireless charging is not performed, if a text message is received, the electronic device 801 may display the text message on a display.

The communicator 805 may receive the first data from the IoT sensor or the IoT device, or transmit the second data to the IoT device.

The wireless charger 811 may include a wireless power transmitter 813. The wireless power transmitter 813 may provide power to the electronic device 801.

If a user puts the electronic device 801 on the wireless charger 811, a charging starts. If a text message is received from outside while the wireless charging is performed, the electronic device 801 may identify the location in which the movement of a user is detected in a house, and re-send the text message received in the IoT device located in a peripheral area of the user. The IoT device may display the received text message on a display. For example, if a user puts the electronic device 801 on the wireless charger 811 in a bedroom, and moves to a living room, if a text message is received to the electronic device 801, the electronic device 801 may send the text message to a smart TV 823 in the living room based on the movement of a user sensed in the living room, and the smart TV 823 may display the received text message on a display. In addition, if a user moves to a kitchen, the electronic device 801 may send the received text message to the IoT device (e.g., a smart refrigerator 821) based on the movement of the user sensed at the kitchen.

The second data may be a content stored in the electronic device. For example, the second data may be a music file. If a user puts the electronic device 801 on the wireless charger

811 while a music file is played, and moves to a living room, the electronic device 801 may stream the music file to the IoT speaker 827 disposed at the living room, and the user may listen the music played in the electronic device 801 without stopping.

Figure 9:
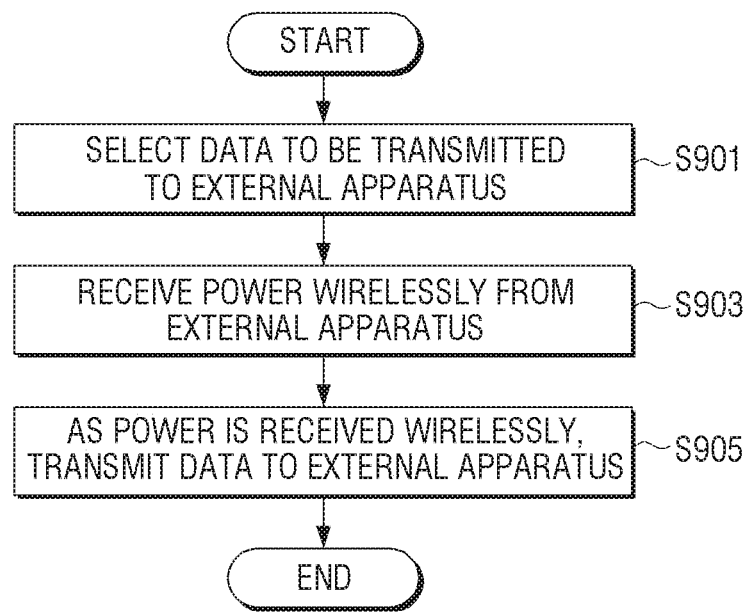
FIG. 9 is a flow chart illustrating a method for transmitting data automatically to an external device in a wireless charging status.

FIG. 9 is a flow chart illustrating a method for transmitting data automatically to an external device in a wireless charging status.

Referring to FIG. 9, the electronic device 101 may select the data to be transmitted to an external device 103 according to a user command in S901. The external device 103 may be a wireless charger which includes a wireless power transmitter and a communicator. The communicator may be, for example, a USB interface 120. The external device 103 may be connected to a PC 105 through the USB interface 120, and receive power for driving the external device 103 or receive and transmit data. The electronic device 101 may display a list of data to be transmitted to the external device 103 on the display. If one data in the list of the data to be transmitted is selected, the electronic device 101 may identify the selected data as the data to be transmitted to the external device 103.

The electronic device 101 may receive power wirelessly from the external device 103 in S903.

The electronic device 101 may transmit data to the external device 103 according to that power is received wirelessly, in S905. Specifically, if power is received from the external device 103 wirelessly, the electronic device 101 may transmit data selected in S901 to the external device 103. Here, a security setting between the electronic device 101 and the external device 103 may be omitted. That is, the electronic device 101 may transmit data to the external device 103 from which power is transmitted according to the power is received wirelessly from the external device 103, without additional security setting. For example, if the electronic device is put on the external device, a wireless charging starts, and the electronic device may transmit data selected by a user to the external device.

In addition, the electronic device 101 may receive a request to provide security information stored in the electronic device 101 from the external device 103, and transmit the security information to the external device 103. For example, if a PC 105 connected with an external device 103 requests the security information, the external device 103 may request the electronic device 101 to provide security information. The electronic device 101 may receive a request to provide the security information from the external device 103, and transmit the security information stored in the memory to the external device 103.

Figure 10:
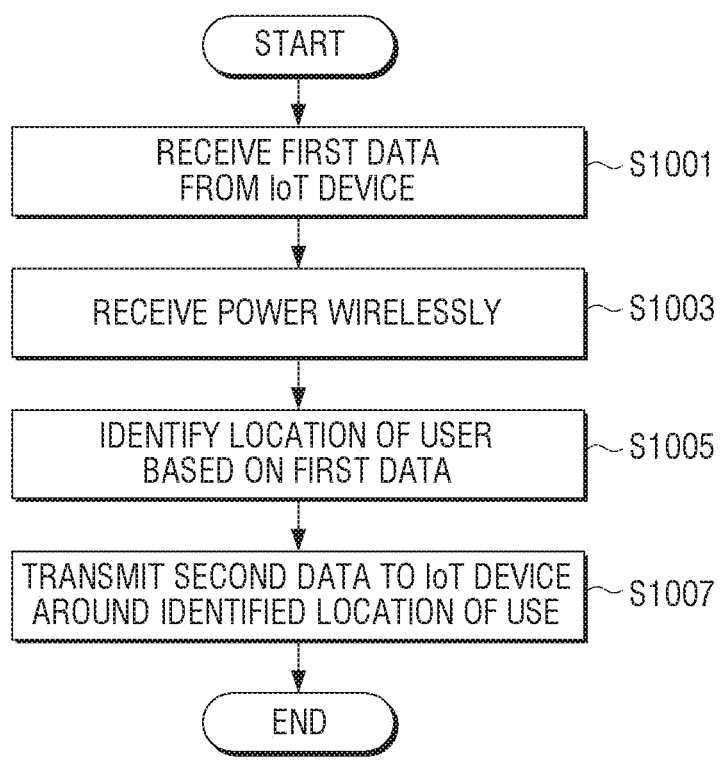
FIG. 10 is a flow chart illustrating a method for transmitting data automatically to an IoT device surrounding a user in a wireless charging status.

FIG. 10 is a flow chart illustrating a method for transmitting data automatically to an IoT device surrounding a user in a wireless charging status.

Referring to FIG. 10, the electronic device 101 receives the first data from an IoT device in S1001. The IoT device may include an IoT sensor, but it is merely an embodiment, and the IoT sensor may be located at a peripheral area of the IoT device. The IoT sensor may detect the movement of a user and output the first data. The electronic device 101 may analyze the received first data, generate an IoT device map, and identify the location of the IoT device located in a house. The electronic device 101 may receive power wirelessly from a wireless charger 103 through a wireless power receiver in S1003. If the electronic device receives power wirelessly, the electronic device 101 may identify the location of a user based on the first data in S1005. For example, if a user puts the electronic device 101 on the wireless charger 103 in a bedroom and moves to a living room, the IoT sensor in the living room detects the movement of the user and transmit the first data to the electronic device. The electronic device 101 may receive the first data output from the IoT sensor disposed at the living room, identify the location of a user based on the received first data, and transmit the second data to the IoT device near the identified user, in S1007. For example, the electronic device 101 may transmit the second data to the smart TV disposed at a living room. The smart TV may display the received second data on a screen. Here, the second data may be a text message received from outside by the electronic device, or an informing message generated inside.

Figure 11:
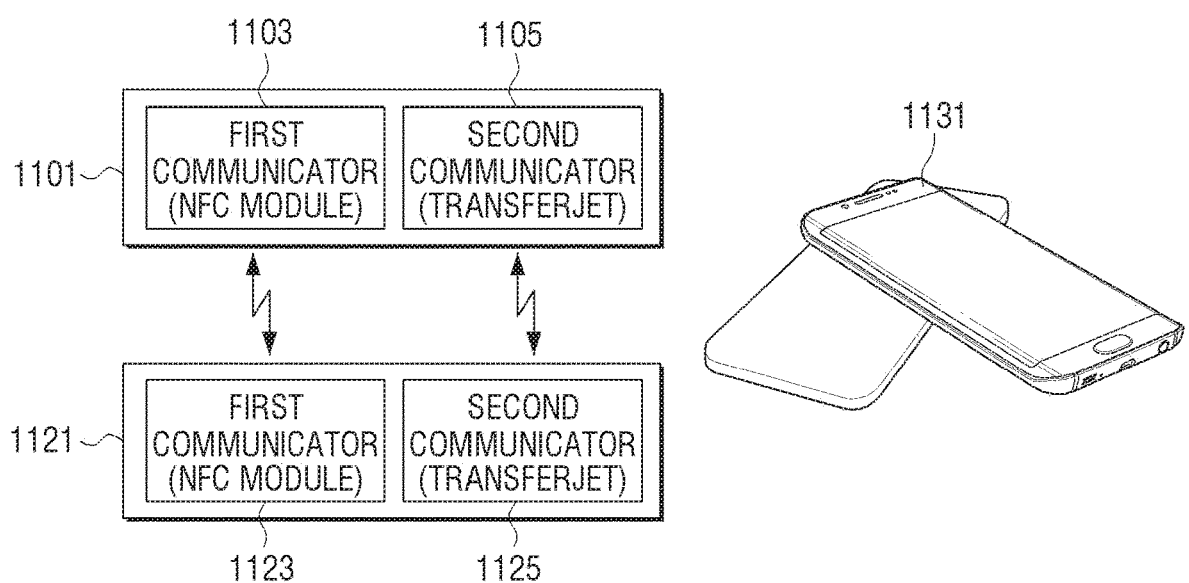
FIG. 11 is a view illustrating an example that data is transmitted by using a NFC module and a TransferJet module.

FIG. 11 is a view illustrating an example that data is transmitted by using a NFC module and a TransferJet module.

Referring FIG. 11, a first electronic device 1101 and a second electronic device 1121 are illustrated.

The first electronic device 1101 may include a first communicator 1103 and a second communicator 1105. The first communicator 1103 and the second communicator 1105 may be a communication module which support a short distance communication. For example, the first communicator 1103 may be an NFC module, and the second communicator 1105 may be a TransferJet module.

The second electronic device 1121 may include a first communicator 1123 and a second communicator 1125. The first communicator 1123 and the second communicator 1125 may be a communication module which support a short distance communication. For example, the first communicator 1123 may be an NFC module, and the second communicator 1125 may be a TransferJet module.

If data is transmitted from the first electronic device 1101 to the second electronic device 1121, the first electronic device 1101 may transmit tag information to the second electronic device 1121 through the first communicator 1103, and prepare to transmit data through the second communicator 1105. The data to be transmitted to the second electronic device 1121 may be identified by a user in advance. The tag information may include the information regarding the data to be transmitted to the second electronic device 1121 (e.g., a file name, size of a file, generated date of a file, etc.).

The second electronic device 1121 may receive tag information from the first electronic device 1101 through the first communicator 1123, and operate the second communicator 1125 based on the received tag information. That is, if the tag information is received from the first electronic device 1123, the second electronic device 1121 may receive data through the second communicator 1125.

For example, in a state in which a user selects the data to be transmitted from the first electronic device 1101 to the second electronic device 1121, if the first electronic device 1101 contacts the second electronic device 1121, the first electronic device 1101 may transmit the tag information to the second electronic device 1121 through the NFC module 1103. The first electronic device 1101 prepares to transmit data by operating a TransferJet module 1105 while transmitting the tag information.

If the tag information is received through the NFC module 1123, the second electronic device 1201 may operate the TransferJet module 1125 and receive data transmitted from the electronic device 1101.

Although exemplary embodiments have been shown and described, it will be appreciated by those skilled in the art that changes may be made to the exemplary embodiments without departing from the principles and spirit of the present disclosure. The operations according to an exemplary embodiment may be realized by a single process. In this case, a program command for performing the operation implemented in various PCs may be recorded in a computer recordable medium. The computer-readable recording medium may include a program command, a data file, a data configuration and a combination thereof. The program commands are specially designed and configured for the embodiments or may be well known to a person skilled in the art. Examples of the computer-readable medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. In the case in which part or all of a base station device or a relay is implemented as a computer program, the computer readable recording medium which stores the program may be included in the embodiments. Accordingly, the scope of the present disclosure is not construed as being limited to the described embodiments but is defined by the appended claims as well as equivalents thereto.

What is claimed is:

1. An electronic device comprising:
    a display;
    a communicator configured to perform a communication with an Internet of Things (IoT) device;
    a wireless power receiver configured to receive power wirelessly from a wireless charger; and
    a processor configured to:
        in response to power being received, via the wireless power receiver, from the wireless charger, identify a location of a user based on first data received from an IoT device, wherein the first data is generated based on the IoT device detecting the user, and
        control the communicator to transmit second data to the IoT device disposed near the location of the user.

2. The electronic device of claim 1, wherein a location of the IoT device is identified based on a signal received from the IoT device.

3. The electronic device of claim 1, wherein the first data is generated based on a movement of a user.

4. The electronic device of claim 1, wherein the second data is a message received from outside the electronic device.

5. The electronic device of claim 4, wherein the processor controls the display to display the second data on the display in response to power not being received in the wireless power receiver.

6. A method comprising:
    receiving, by an electronic device via a communicator, first data from an internet of things (IoT) device;
    receiving, by the electronic device via a wireless power receiver, power wirelessly from a wireless charger;
    in response to the power being wirelessly received, via the wireless power receiver of the electronic device, from the wireless charger, identifying, by the electronic device, a location of a user based on the first data, wherein the first data is generated based on the IoT device detecting the user; and
    transmitting, by the electronic device via the communicator, second data to the IoT device near the identified location of the user.

7. The method of claim 6, wherein a location of the IoT device is identified based on a signal received from the IoT device.

* * * * *